(No Model.)
L. H. GUERTIN.
IMPALEMENT TRAP.
No. 593,933. Patented Nov. 16, 1897.
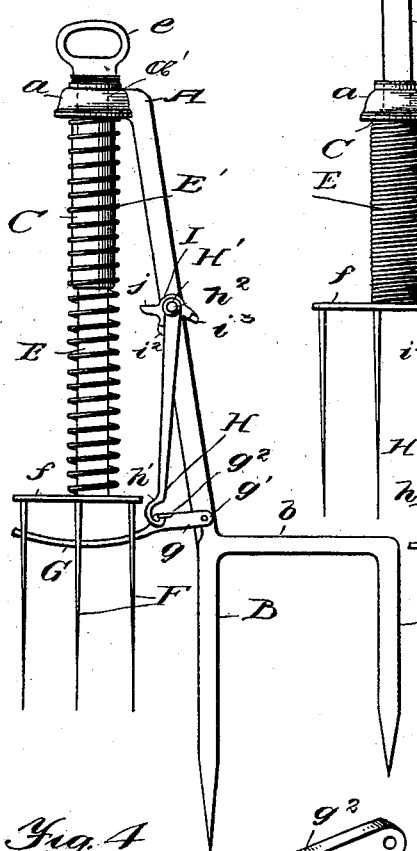
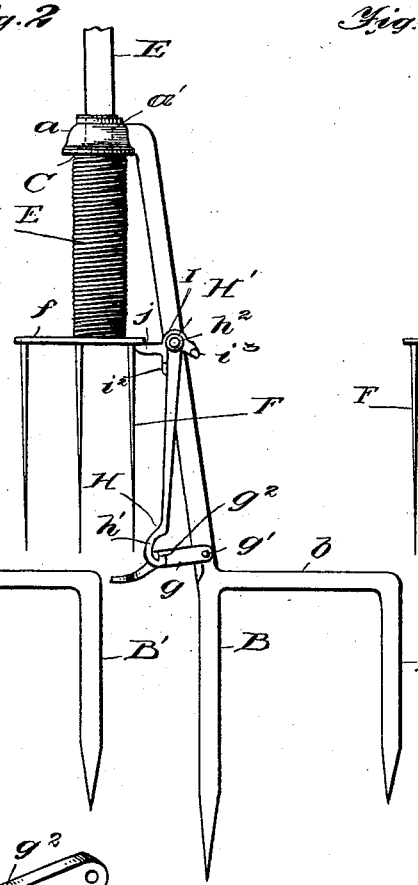
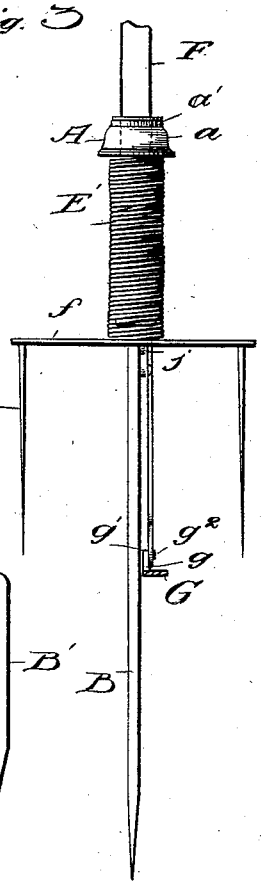
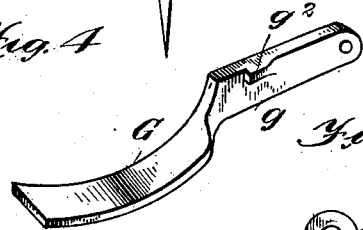
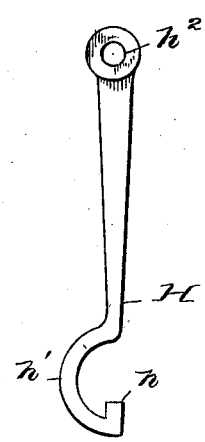
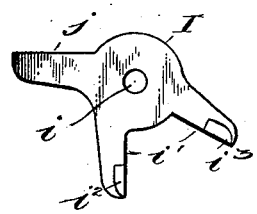
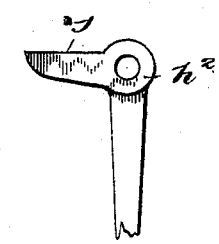
Witnesses:
Inventor
Lewis H. Guertin
by Eden Bro's
Attorneys.

UNITED STATES PATENT OFFICE.

LEWIS H. GUERTIN, OF MOMENCE, ILLINOIS.

IMPALEMENT-TRAP.

SPECIFICATION forming part of Letters Patent No. 593,933, dated November 16, 1897.

Application filed January 30, 1897. Serial No. 621,322. (No model.)

*To all whom it may concern:*

Be it known that I, LEWIS H. GUERTIN, a citizen of the United States, residing at Momence, in the county of Kankakee and State of Illinois, have invented certain new and useful Improvements in Impalement-Traps; and I do hereby declare the following to be a full, clear, and exact description of the invention, such as will enable others skilled in the art to which it appertains to make and use the same.

My invention relates to improvements in impalement-traps; and the objects that I have in view are, first, to provide a simple contrivance which may be easily and securely held in position in the ground over a mole-burrow, and, secondly, to provide an improved trip mechanism adapted to be quickly adjusted in operative relation to the fork or spear-head and the operating-shoe.

With these ends in view my invention consists in the novel combination of devices and in the construction and arrangement of parts which will be hereinafter fully described and claimed.

To enable others to understand my invention, I have illustrated the preferred embodiment thereof in the accompanying drawings, attached hereto and forming a part hereof, and in which—

Figure 1 is a side elevation of my trap with the spear-head released. Fig. 2 is a side elevation of the trap in its "set" position, ready for operation. Fig. 3 is a front elevation. Fig. 4 is a detail view of the releasing-shoe. Fig. 5 is a detail view of the trigger, and Fig. 6 is a similar view of the tappet. Fig. 7 is a modified form of the trigger.

Like letters of reference denote corresponding parts in all the figures of the drawings, referring to which—

A designates the supporting standard or upright, which is provided at its upper end with a head $a$, which extends from one side of the upright and through which head is formed a vertical opening $a'$. The lower end of this upright A is provided on the side opposite to the head $a$ with the horizontal foot $b$, and from this foot depend the prongs B B', one longer than the other and both pointed at their lower extremities to enable said prongs to be easily forced into the ground. The prongs B B' are integral with the foot $b$ and the latter is integral with upright A, thus providing a simple, strong, and cheap form of framework for supporting the operative parts of a trap. The foot $b$ forms a convenient place for the operator to place his foot in forcing the prongs into the ground, and said prongs serve to hold the trap securely in position against accidental displacement.

C indicates an elongated hollow guide which lies alongside of the upright A and is arranged in alinement with the opening $a'$ in the head $a$, to which the guide C is fastened in a suitable way. Through the opening in the head $a$ and the passage in the hollow guide extends a plunger or rod E, the upper end of which is provided with a handle $e$ by which the plunger may be raised against the tension of the coiled spring E'. The lower end of this plunger is fastened to the flat head $f$, to which are attached the pendent spears or forks F, preferably six in number, although the particular number is not material. The coiled spring E' is fitted loosely around the plunger and the hollow fixed guide, and one end of this spring bears against the head $a$, while the other end presses upon the spear-head or plate $f$ in order to normally press the spear-head and plunger downward until the handle $e$ abuts on the guide-head $a$, which handle serves as a stop to arrest the descent of the spears or forks.

G indicates the operating-shoe, in the form of a curved plate having an extended shank $g$, which has one end pivotally attached, as at $g'$, to the upright or standard A, thus adapting the shoe to move or swing in a vertical plane. The shank $g$ is provided at an intermediate point between the shoe and the pivot with a lateral or offstanding flange $g^2$, which extends from one face or side of the shank and which has a beveled heel that inclines toward the pivot $g'$. With said offstanding flange $g^2$ of the shoe is adapted to engage the lug $h$ on the hook-shaped lower extremity of a trigger H. This trigger consists of a straight bar having the aforesaid hook-shaped end (designated at $h'$) and the lug $h$ and provided with a perforated head $h^2$ at its upper extremity, and through the perforation in the enlarged upper end of said trigger passes the pivotal bolt or pin H', which is fastened to the upright A at a suitable distance above the pivot $g'$ of the shoe G.

On the same bolt that forms the pivot of the trigger is loosely fitted the oscillating tappet I, which forms the operative connection between the trigger and the spear-head when the trap is set, and said tappet is constructed in a novel way to adapt it to be operated independently of the trigger under some circumstances. It is desirable in adjusting the trap for service to first place the trap in position by forcing the prongs into the ground, so that the shoe G rests upon the ground immediately over the mole-burrow, and to then connect the trigger to the shoe, leaving the spear the last adjustment required to set the trap in operative position, thus reducing to a minimum the danger of injury to the person of the trap being accidentally sprung. The tappet consists of a centrally-perforated plate $i$, having the pair of arms $i'$ provided with the lugs $i^2$ $i^3$ and the toe-piece $j$. The tappet-plate is fitted on the pivot-bolt H' between the trigger and the upright, and the arms $i'$ of the tappet are spaced apart a distance greater than the width of the trigger, so that the tappet may oscillate a limited distance without permitting the lugs $i^2 i^3$ to strike the trigger. These lugs extend laterally from the arms of the trigger in order to engage therewith, and the toe-piece $j$ extends from the tappet toward the vertical plane of the spear-head $f$ in order that said toe may lie in the path of the spear-head.

The trap is placed over a mole-burrow by forcing, with the aid of the operator's foot applied to the plate $a$, the prongs B B' into the ground, so that the shoe G rests directly upon the earth raised by the burrow. The trigger H is now adjusted to have its stud $h$ engage with the flange $g^2$ on the shoe-shank, and the handle $e$ is now raised to lift the plunger and spear against the tension of the spring, after which the tappet is adjusted to have its toe-piece $j$ fit beneath the spear-head $f$ and its lug $i^2$ press against the trigger to hold the stud $h$ thereon in engagement with the flanged shoe. This shoe is adapted to be lifted when a mole passes through the burrow, thus releasing the trigger from the shoe and allowing the trigger and tappet to be turned by the spring on the pivot H' and force the trigger back of the upright or standard, whereby the tappet is released from the spear-head and the recoil of the spring presses the head $f$ and spears downward with considerable energy to cause the spears to impale the animal.

I am aware that changes in the form and proportion of parts and in the details of construction herein shown and described as the preferred embodiment of my invention may be made by a skilled mechanic without departing from the spirit or sacrificing the advantages of my invention, and I therefore reserve the right to make such modifications and alterations as fairly fall within the scope of my invention.

While I prefer to use the tappet made in a separate piece from the trigger, for the reasons before stated, yet the toe-piece may be made as a part of the trigger under some circumstances—as, for instance, when it is desired to simplify the construction. In Fig. 7 of the drawings I have shown the head of the trigger as provided with a toe-piece which projects laterally from the side of the trigger, so as to engage with the spear-head.

Having thus fully described my invention, what I claim as new, and desire to secure by Letters Patent, is—

1. The combination of a framework, and a spring-controlled spear, of a horizontal operating-shoe G having its shank pivoted to the framework, a trigger H having its lower end operatively engaging with the shoe, a tappet arranged to engage with the trigger and with the spear-head, and a common pivot which connects the tappet and the upper end of the trigger to the framework, as and for the purposes described.

2. The combination with a suitable framework, and a spring-controlled spear, of an operating-shoe, a trigger to engage with said shoe and pivoted to the framework, and a tappet pivoted to the framework and having the spaced devices to engage with the trigger and a projecting toe-piece to engage the spear-head, substantially as and for the purposes described.

3. The combination with a framework and a spring-controlled plunger or spear, of the shoe G having a shank pivoted at $g'$ to the framework and provided at an intermediate point of its length with the flange $g^2$ which extends horizontally from one side of said shank, a trigger provided with a hook-shaped free end $h'$ and a stud $h$ to fit beneath the flange $g^2$ of the shoe, and means whereby the upper end of the trigger may be operatively engaged with the spear-head.

In testimony whereof I affix my signature in presence of two witnesses.

LEWIS H. GUERTIN.

Witnesses:
ALFRED E. HOOPER,
J. V. LEWIS.